UNITED STATES PATENT OFFICE.

CHARLES A. BECKER, OF NEWARK, NEW JERSEY.

PROCESS OF SOLDERING CHAIN.

1,113,947. Specification of Letters Patent. Patented Oct. 20, 1914.

No Drawing. Application filed June 20, 1913. Serial No. 774,781.

*To all whom it may concern:*

Be it known that I, CHARLES A. BECKER, a citizen of the United States, and a resident of Newark, in the county of Essex and State of New Jersey, have invented certain Improvements in Processes of Soldering Chain, of which the following is a specification.

This invention relates to the soldering of chain made from solder wire or wire having a core of solder, and the objects of the invention are to secure a perfect union of the ends of the wire in each link; to prevent any connection of adjacent links to each other by escaping solder; to prevent any solder adhering to the outer surface of the links or chain; to attain these results by a simple process with few steps or operations; to secure a high grade product of clean appearance, and to obtain other advantages and results as may be brought out in the following description.

In carrying out my invention chain formed from solder wire in the well-known chain-making machines, which bend the links and connect them together with their joints between the ends of the wire open, is treated with a solution of borax or other soldering salt, as by boiling it in such a solution, and dried, so that the chain is covered with crystals of the soldering salt. These crystals are afterward removed from the outer surface of the links by any suitable mechanical means, such as rubbing, but this leaves soldering salt crystals between the ends of the wire of each link. The chain is then heated in a machine similar to a soldering machine, but only to such a degree of heat as will melt or fuse the soldering salt remaining in the joints of the links, without causing the solder in the wire of which the links are composed to run or soften for joining. This heating may cause more or less surplus soldering salt to run out of the joint onto the outer surface of the links, however, and therefore after being thus heated the chain is again rubbed or subjected to mechanical means for removing this soldering salt from the outer surface of its links, though without affecting the soldering salt between the ends of the wire of each link. After this second treatment for the removal of soldering salt, the chain is run through a soldering machine and the joints closed by the heat of the flame causing the solder to run or soften, as will be understood by those skilled in the art. It should be noted that when this closing is done the joint surfaces of the links are coated with soldering salt, while the rest of the surface of the links is devoid of any soldering salt whatever. Furthermore, the coating on the joint surfaces is uniform and even, and not too heavy, because all surplus soldering salt has been melted out by the second heating. I thus secure a very clean and perfect closure of the links.

Preferably the chain is rubbed with sawdust or other granular material to remove the soldering salt as described, and one advantage of my improved process is that the second rubbing of this kind can be much more vigorous and effective because the fused soldering salt affords more or less connection between the ends of the links. The soldering salt upon the other surfaces of the chain can thus be removed perfectly and quickly without detriment to the joints.

Having thus described the invention, what I claim is:

1. A process of soldering chain made from solder wire, consisting in coating the chain with a soldering salt, removing a portion of said coating, subjecting the chain to heat sufficient to melt the soldering salt but insufficient to melt the solder, removing all soldering salt from the surface of the chain other than the joint surfaces of the links, and closing the joints by heating the chain.

2. A process of soldering chain made from solder wire, consisting in coating the chain with a soldering salt, mechanically removing a portion of said coating, subjecting the chain to heat sufficient to melt the soldering salt but insufficient to melt the solder, mechanically removing all soldering salt from the surface of the chain other than the joint surfaces of the links, and closing the joints by heating the chain.

3. A process of soldering chain made from solder wire, consisting in coating the chain with a soldering salt, removing a portion of said coating, subjecting the chain to heat sufficient to melt the soldering salt but insufficient to melt the solder, rubbing the chain to remove all soldering salt except from the joint surfaces of the links, and closing the joints by heating the chain.

4. The process of soldering chain links having solder cores, which consists in boiling the links in a solution of fusible flux, removing the solvent of the flux adhering to the links, removing the flux adhering to the surfaces of the links, heating the links to a temperature at which the residual flux in the joints melts, removing the flux which issues from the joints by reason of the melting, and heating the links to the soldering temperature.

5. The process of soldering links having solder cores, which consists in boiling the links in a solution of fusible flux, evaporating the solvent of the flux adhering to the links, removing the dry flux adhering to the surfaces of the links, heating the links to a temperature at which the residual flux in the joints melts, removing the flux which issues from the joints by reason of the melting, and heating the links to the soldering temperature.

6. The process of soldering chain links having solder cores, which consists in boiling the links in a solution of borax, removing the borax solvent adhering to the links, removing the borax adhering to the surfaces of the links, heating the links to a temperature at which the residual borax in the joints melts, removing the borax which issues from the joints by reason of the melting, and heating the links to the soldering temperature.

CHARLES A. BECKER.

Witnesses:
HOWARD P. KING,
MILDRED E. BROOKS.

---

Copies of this patent may be obtained for five cents each, by addressing the "Commissioner of Patents. Washington, D. C."